United States Patent
Chen et al.

(10) Patent No.: US 9,152,272 B2
(45) Date of Patent: Oct. 6, 2015

(54) MULTIPOINT POSITIONING METHOD FOR TOUCHPAD

(71) Applicant: PixArt Imaging Inc., Hsin-Chu (TW)

(72) Inventors: Hsin-Chia Chen, Hsin-Chi (TW); Tse-Chung Su, Hsin-Chu (TW); Ming-Tsan Kao, Hsi-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 226 days.

(21) Appl. No.: 13/973,948

(22) Filed: Aug. 22, 2013

(65) Prior Publication Data
US 2014/0055393 A1 Feb. 27, 2014

(30) Foreign Application Priority Data
Aug. 23, 2012 (TW) .............................. 101130735 A

(51) Int. Cl.
*G06F 3/044* (2006.01)
*G06F 3/041* (2006.01)
*G06F 3/042* (2006.01)
*G06F 3/0354* (2013.01)

(52) U.S. Cl.
CPC .......... *G06F 3/0416* (2013.01); *G06F 3/03547* (2013.01); *G06F 3/042* (2013.01); *G06F 3/044* (2013.01); *G06F 2203/04104* (2013.01)

(58) Field of Classification Search
CPC ....................... G06F 3/044; G06F 2203/04104
See application file for complete search history.

(56) References Cited

U.S. PATENT DOCUMENTS

| 5,825,352 A | 10/1998 | Bisset et al. |
| 2011/0017633 A1 | 1/2011 | Holstein et al. |
| 2012/0194452 A1 | 8/2012 | Cho et al. |

*Primary Examiner* — Michael Pervan
(74) *Attorney, Agent, or Firm* — Lowe Hauptman & Ham, LLP

(57) ABSTRACT

A multipoint positioning method for a touchpad including the steps of: scanning a touchpad to retrieve two-dimensional data; calculating an object area and a number of maxima of local maxima in the two-dimensional data; comparing the object area with an area threshold when the number of maxima is larger than 1; and identifying positions of the local maxima as a plurality of contact positions when the object area is larger than or equal to the area threshold.

20 Claims, 7 Drawing Sheets not edge, not corner     $V(x,y) \geq V(x-1,y-1), V(x,y-1), V(x+1,y-1), V(x-1,y), V(x+1,y), V(x-1,y+1), V(x,y+1), V(x+1,y+1)$ upper edge

| V(x-1,y) | V(x,y) | V(x+1,y) |
|---|---|---|
| V(x-1,y+1) | V(x,y+1) | V(x+1,y+1) | left edge

| V(x,y-1) | V(x+1,y-1) |
|---|---|
| V(x,y) | V(x+1,y) |
| V(x,y+1) | V(x+1,y+1) | lower edge

| V(x-1,y-1) | V(x,y-1) | V(x+1,y-1) |
|---|---|---|
| V(x-1,y) | V(x,y) | V(x+1,y) | right edge

| V(x-1,y-1) | V(x,y-1) |
|---|---|
| V(x-1,y) | V(x,y) |
| V(x-1,y+1) | V(x,y+1) | upper-left corner

| V(x,y) | V(x+1,y) |
|---|---|
| V(x,y+1) | V(x+1,y+1) | upper-right corner

| V(x-1,y) | V(x,y) |
|---|---|
| V(x-1,y+1) | V(x,y+1) | lower-left corner

| V(x,y-1) | V(x+1,y-1) |
|---|---|
| V(x,y) | V(x+1,y) | lower-right corner

| V(x-1,y-1) | V(x,y-1) |
|---|---|
| V(x-1,y) | V(x,y) |

FIG. 4

MULTIPOINT POSITIONING METHOD FOR TOUCHPAD

CROSS REFERENCE TO RELATED APPLICATION

This application claims the priority benefit of Taiwan Patent Application Serial Number 101130735, filed on Aug. 23, 2012, the full disclosure of which is incorporated herein by reference.

BACKGROUND

1. Field of the Disclosure

This disclosure generally relates to a touch sensing device and, more particularly, to a multipoint positioning method for a touchpad capable of detecting the multi-touch operation.

2. Description of the Related Art

As the touch control can be performed easily and without using conventional extra peripheral devices, such as the mouse or keyboard, it has gradually been applied to various portable electronic products, wherein single-touch technology has become mature but multi-touch technology still has the problem of unable to distinguish multiple fingers in some specific conditions in both capacitive touch panels or optical touch panels, especially in the condition that more than two fingers are very close to each other.

U.S. Pat. No. 5,825,352, entitled "Multiple Fingers Contact Sensing Method for Emulating Mouse Buttons and Mouse Operations on a Touch Sensor Pad", discloses a sensing method for identifying multiple fingers according to one-dimensional information. The sensing method retrieves one-dimensional information at first as shown in FIG. 1A, and then respectively identifies a first peak $P_1$, a valley $V_1$ and a second peak $P_2$ in the one-dimensional information. Next, a first finger area and a second finger area are separated according to the valley $V_1$. Then, a finger position of the first finger area is obtained by calculating a first centroid of the first finger area, and a finger position of the second finger area is obtained by calculating a second centroid of the second finger area to divide different fingers. However, this method has to identify the valley $V_1$ at first and then two finger areas can be separated accordingly.

As shown in FIG. 1B, when a second peak $P_2'$ is significantly larger than a first peak $P_1'$, using a valley $V_1'$ to separate a first finger area and a second finger area may cause the asymmetry of the separated finger areas. When the centroid is used to locate the finger position, the finger position can have deviation such that the control error may occur.

Accordingly, the present disclosure further provides a multipoint positioning method for a touchpad that may simplify and increase the accuracy of the multipoint positioning procedure.

SUMMARY

The present disclosure provides a multipoint positioning method for a touchpad that may perform the multipoint positioning only according to the local maxima of two-dimensional data so as to simplify the multipoint positioning procedure.

The present disclosure further provides a multipoint positioning method for a touchpad that may distinguish two-dimensional object area using image grouping technique and perform the multipoint positioning according to the local maxima in the two-dimensional object area.

The present disclosure further provides a multipoint positioning method for a touchpad that may recognize the multipoint operation according to current two-dimensional data as well as previous two-dimensional data so as to increase the positioning accuracy.

The present disclosure provides a multipoint positioning method for a touchpad including the steps of: scanning a touchpad to retrieve two-dimensional data; calculating an object area and a number of maxima of local maxima in the two-dimensional data; comparing the object area with an area threshold when the number of maxima is larger than 1; and identifying positions of the local maxima as a plurality of contact positions when the object area is larger than or equal to the area threshold.

The present disclosure further provides a multipoint positioning method for a touchpad including the steps of: scanning a touchpad to retrieve two-dimensional data; identifying a plurality of matrix cells in the two-dimensional data having a data value larger than or equal to a data threshold as an object area; calculating a number of maxima of local maxima in the object area; comparing the object area with an area threshold when the number of maxima is larger than 1; and identifying positions of the local maxima as a plurality of contact positions when the object area is larger than or equal to the area threshold.

The present disclosure further provides a multipoint positioning method for a touchpad including the steps of: scanning a touchpad to sequentially retrieve first two-dimensional data and second two-dimensional data; calculating a first object number of the first two-dimensional data and a second object number of the second two-dimensional data; calculating a number of maxima of local maxima in the second two-dimensional data when the second object number is smaller than the first object number; and recording positions of the local maxima when the number of maxima is larger than 1.

In one aspect, the two-dimensional data is intensity data or voltage variation data; and the data threshold is an intensity threshold or a voltage variation threshold associated with the two-dimensional data.

In one aspect, the positions of the local maxima are identified as a plurality of contact positions when the object area is larger than or equal to an area threshold; and a single object is identified when the object area is smaller than the area threshold. In this manner, the identification accuracy can be improved.

In one aspect, the positions of the local maxima are identified as a plurality of contact positions when the distance between the local maxima is larger than or equal to a distance threshold; and a single object is identified when the distance between the local maxima is smaller than the distance threshold. In this manner, the identification accuracy can be improved.

In one aspect, the local maxima are matrix cells in the two-dimensional data having a data value larger than or equal to data values of 8 adjacent matrix cells thereof, 5 adjacent matrix cells thereof or 3 adjacent matrix cells thereof.

The multipoint positioning method for a touchpad of the present disclosure is to identify the local maximum in the two-dimensional data as the contact position so as to simplify the identification procedure. In addition, the object area and the distance between local maxima may further be confirmed so as to further improve the identification accuracy.

BRIEF DESCRIPTION OF THE DRAWINGS

Other objects, advantages, and novel features of the present disclosure will become more apparent from the following detailed description when taken in conjunction with the accompanying drawings.

FIG. 4 shows a schematic diagram of identifying the local maximum in the multipoint positioning method according to the embodiment of the present disclosure.

DETAILED DESCRIPTION OF THE EMBODIMENT

It should be noted that, wherever possible, the same reference numbers will be used throughout the drawings to refer to the same or like parts.

Figure 1A:
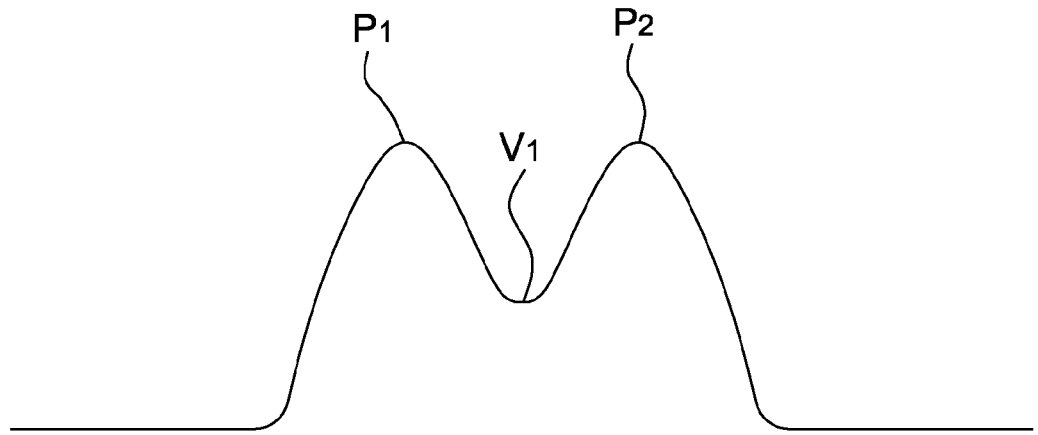
FIGS. 1A-1B show schematic diagrams of the conventional multiple fingers contact sensing method.
Figure 1B:
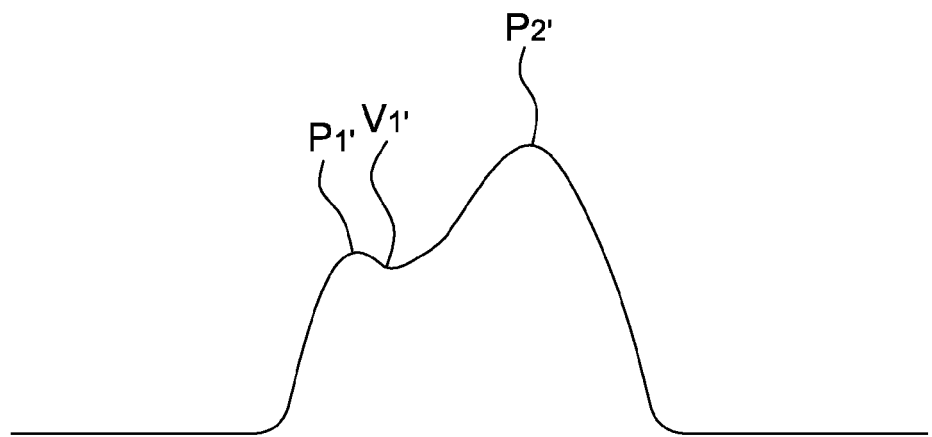
Figure 2:
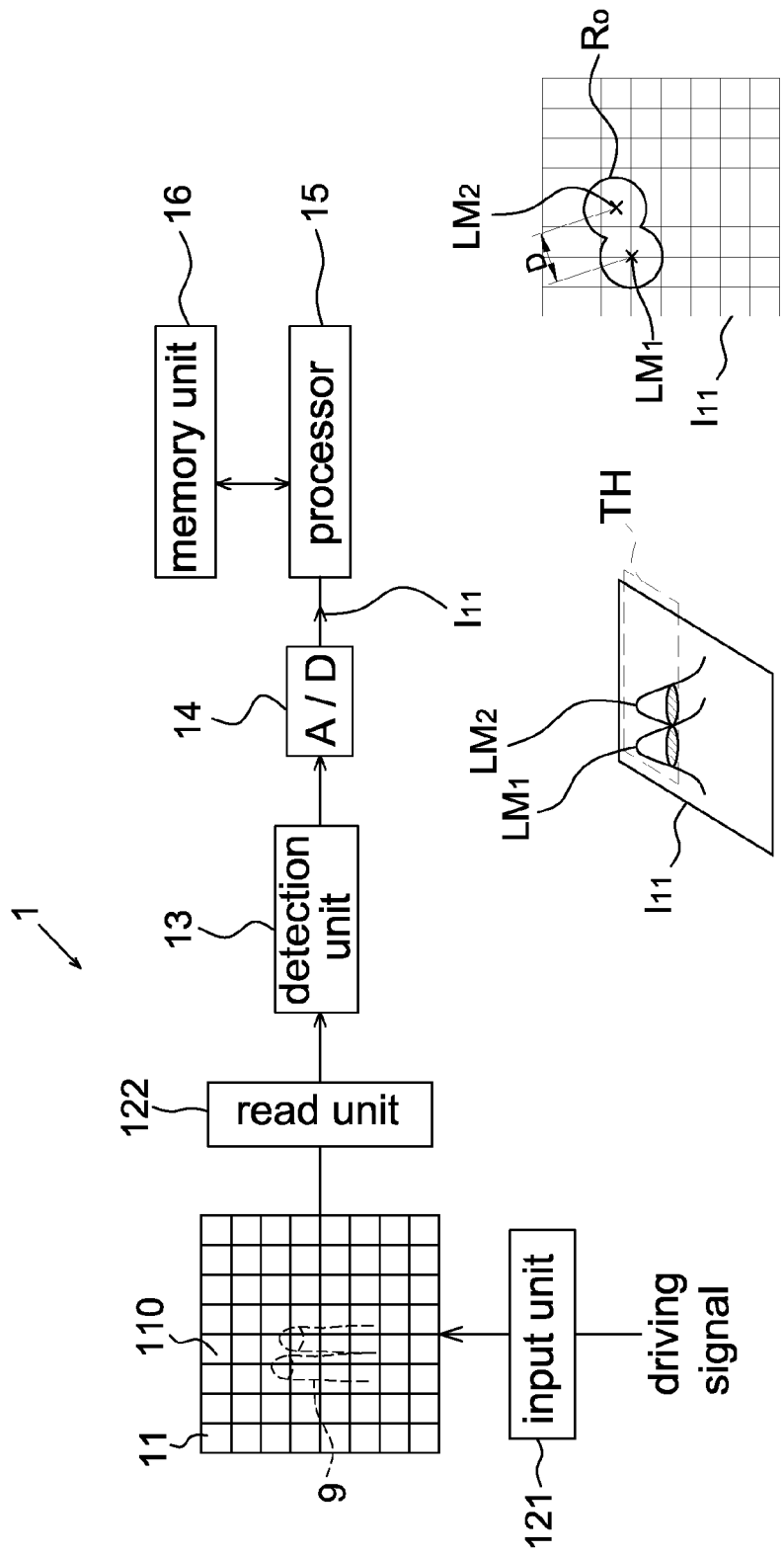
FIG. 2 shows a schematic block diagram of the touch system according to an embodiment of the present disclosure.

Referring to FIG. 2, it shows a schematic block diagram of the touch system 1 according to an embodiment of the present disclosure. The touch system 1 includes a touchpad 11, an input unit 121, a read unit 122, a detection unit 13, an analog-to-digital converter (A/D converter) 14, a processing unit 15 and a memory unit 16.

The touch system 1 according to the embodiment of the present disclosure is configured to detect at least one contact position of at least one object, e.g. a finger or a touch pen, on the touchpad 11, particularly configured to detect a plurality of contact positions in coupled detection data generated by a plurality of objects, which are close to each other, in contact with the touchpad 11. In this embodiment, the touchpad 11 may be a capacitive touch panel or an optical touch panel without any limitation as long as the touchpad is able to output two-dimensional matrix data. The touchpad 11 includes a sensing matrix formed by arranging a plurality of matrix cells 110 in a matrix, which may be a rectangle matrix or a square matrix. In addition, the touch system 1 may further have denoising function so as to avoid the interference from noise having specific frequencies; for example, the input unit 121 may input different driving frequencies according to environmental noises.

The input unit 121 may sequentially input electrical signals having a predetermined waveform or a predetermined frequency to every column/row of matrix cells 110 of the touchpad 11, and the read unit 122 may sequentially read data values of every column/row of matrix cells 110 of the touchpad 11 corresponding to the operation of the input unit 121, wherein the matrix cell 110 is referred to every sensing unit of the touchpad 11. For example, when the touchpad 11 is an optical touch panel, the matrix cell 110 may be each pixel of the sensing matrix; and when the touchpad 11 is a capacitive touch panel, the matrix cell 110 may be the crossing area of two conductive lines. In one embodiment, the input unit 121 and the read unit 122 may be a multiplexer, but not limited thereto, as long as they are the electronic devices capable of inputting driving signals and reading data values in a scanning manner. It is appreciated that the input unit 121 may not be implemented according to different embodiments of the touchpad 11.

The detection unit 13 is configured to sequentially detect data values through the read unit 122 for being transmitted to the A/D converter 14. The A/D converter 14 is configured to convert the analog data to the digital data and output two-dimensional matrix data $I_{11}$. It is appreciated that when the touchpad 11 is an optical touch panel, the two-dimensional matrix data $I_{11}$ is intensity data; whereas when the touchpad 11 is a capacitive touch panel, the two-dimensional matrix data $I_{11}$ is voltage variation data. In other words, according to different embodiments of the touchpad 11, the two-dimensional matrix data $I_{11}$ received by the processing unit 15 may have different physical meaning.

The processing unit 15 may be a digital signal processor (DSP) and is configured to calculate a contact position of at least one object in the two-dimensional matrix data $I_{11}$, and particularly configured to calculate a plurality of contact positions associated with a plurality of objects. For example in FIG. 2, it is shown that two fingers 9 are in contact with the touchpad 11, and thus the two-dimensional matrix data $I_{11}$ (including a solid diagram and a top view) received by the processing unit 15 contains two object information. The processing unit 15 is configured to respectively locate a plurality of contact positions coupled to each other.

The memory unit 16 is configured to store various reference information needed in the positioning procedure performed by the processing unit 15, e.g. an area threshold, a distance threshold and data threshold (including an intensity threshold and a voltage variation threshold). Of course, if the processing unit 15 is further able to perform the gesture recognition according to the variation of contact positions between a plurality of two-dimensional matrix data $I_{11}$, the memory unit 16 may further store the information associated with predetermined gestures. The method of performing the gesture recognition according to the variation between different data is well known, and this disclosure is to distinguish the coupled contact information.

Figure 3:
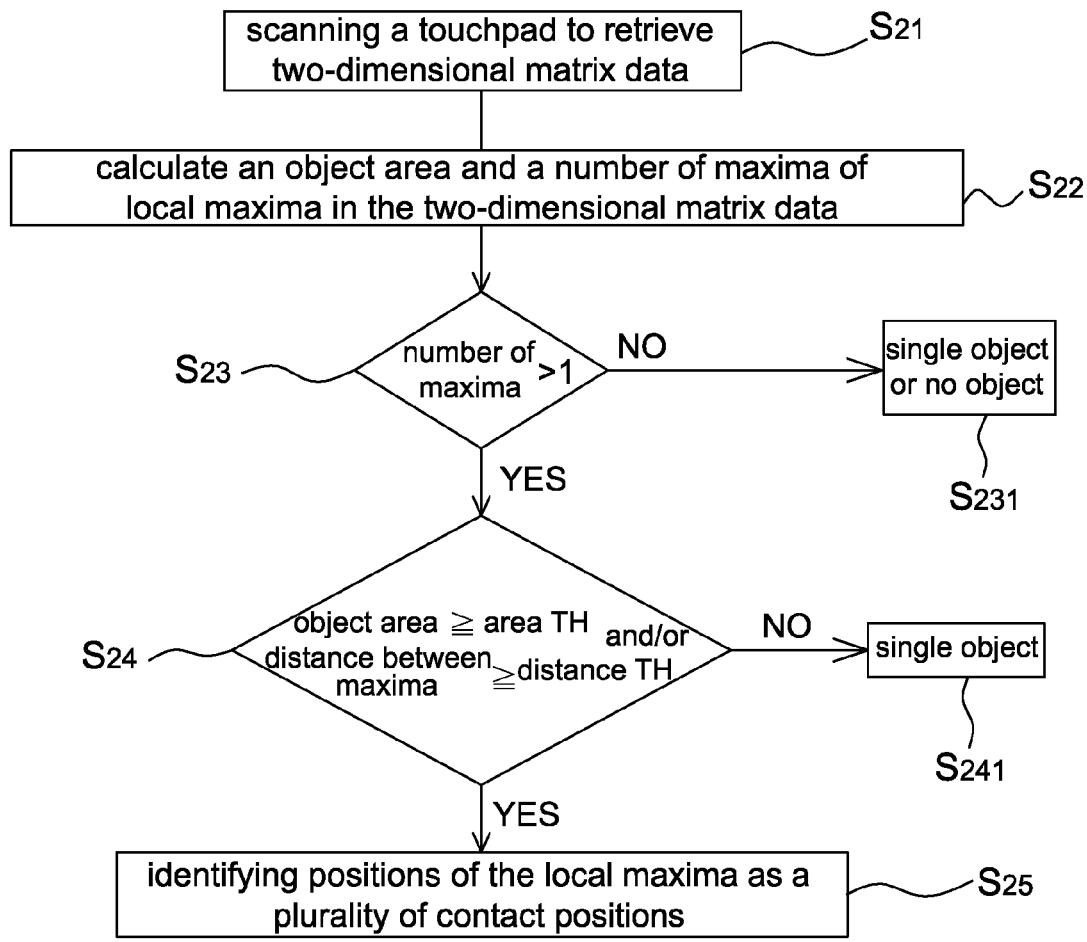
FIG. 3 shows a flow chart of the multipoint positioning method for a touchpad according to a first embodiment of the present disclosure.

Referring to FIG. 3, it shows a flow chart of the multipoint positioning method for a touchpad according to a first embodiment of the present disclosure, which includes the step of: scanning a touchpad to retrieve two-dimensional matrix data (Step $S_{21}$); calculating an object area and a number of maxima of local maxima in the two-dimensional matrix data (Step $S_{22}$); identifying whether the number of maxima is larger than 1 (Step $S_{23}$); if no, identifying a single object or no object (Step $S_{231}$), if yes, entering Step $S_{24}$; comparing the object area with an area threshold and/or comparing a distance between the local maxima with a distance threshold (Step $S_{24}$); when the object area is smaller than the area threshold and/or the distance between the local maxima is smaller than the distance threshold, identifying a single object (Step $S_{241}$); when the object area is larger than or equal to the area threshold and/or the distance between the local maxima is larger than or equal to the distance threshold, identifying positions of the local maxima as a plurality of contact positions (Step $S_{25}$); wherein, it is an option to perform one or two of the comparison processes in the Step $S_{24}$ so as to make sure that the plurality of local maxima are not caused by noise. In addition, the local maxima herein may be positive values or negative values according to different embodiments; i.e. the local maxima may be the absolute value of a local maximum.

Referring to FIGS. 2 to 4, details of the multipoint positioning method for a touchpad according to the first embodiment of the present disclosure are described hereinafter.

Step $S_{21}$: At first, the input unit 121 and the read unit 122 scan the touchpad 11 so as to retrieve two-dimensional matrix data $I_{11}$ as shown in FIG. 2. The detection unit 13 detects analog data through the read unit 122 and the analog data is converted to the two-dimensional matrix data $I_{11}$ by the A/D converter 14.

Step $S_{22}$: The processing unit 15 calculates an object area $R_O$ and a number of maxima of local maxima in the two-dimensional matrix data $I_{11}$ at the time receiving the two-dimensional matrix data $I_{11}$ (e.g. at the same time sequentially receiving data of every matrix cell 110) or after receiving the two-dimensional matrix data $I_{11}$ (e.g. after the two-dimensional matrix data $I_{11}$ is completely received), e.g. two local maxima $LM_1$ and $LM_2$ are shown in FIG. 2 and thus the number of maxima is 2 herein. As mentioned above, corresponding to the type of the touchpad 11, the two-dimensional matrix data $I_{11}$ may be intensity data or voltage variation data. The memory unit 16 may previously store at least one data threshold TH, e.g. including an intensity threshold or a voltage variation threshold. The processing unit 15 may identify an area in the two-dimensional matrix data $I_{11}$ having intensity data larger than or equal to the intensity threshold or having voltage variation data larger than or equal to the voltage variation threshold as the object area $R_O$. The processing unit 15 may combine related object sections in adjacent rows to form a complete object area by means of image grouping technique. The image grouping may be referred to U.S. Publication No. 2011/017633, entitled "Image Recognition Method" and assigned to the same assignee of the present application, and the full disclosure of which is incorporated herein by reference.

In this embodiment, the local maxima $LM_1$ and $LM_2$ may be the matrix cell in the two-dimensional matrix data $I_{11}$ having a data value larger than data values of 8 adjacent matrix cells, 5 adjacent matrix cells or 3 adjacent matrix cells thereof. For example referring to FIG. 4, when a matrix cell 110 is not located at the edge or corner, a data value V(x,y) of the matrix cell 110 is larger than or equal to that of its 8 adjacent matrix cells; i.e. $V(x,y) \geq V(x-1,y-1) \& V(x-1,y) \& V(x-1,y+1) \& V(x,y-1) \& V(x,y+1) \& V(x+1,y-1) \& V(x+1,y) \& V(x+1,y+1)$. When a matrix cell 110 is located at the edge, a data value V(x,y) of the matrix cell 110 is larger than or equal to that of its 5 adjacent matrix cells; e.g. FIG. 4 shows the matrix cell 110 is respectively located at the upper edge, lower edge, left edge and right edge. When a matrix cell 110 is located at the corner, a data value V(x,y) of the matrix cell 110 is larger than or equal to that of its 3 adjacent matrix cells; e.g. FIG. 4 shows the matrix cell 110 is respectively located at the upper-left corner, upper-right corner, lower-left corner and lower-right corner.

Step $S_{23}$: The purpose of identifying whether the number of maxima is larger than 1 is to determine whether to enter multipoint positioning procedure or not. When the number of maxima is equal to 0, it means that there is no object existing whereas when the umber of maxima is equal to 1, it means that only a single object exists (Step $S_{231}$), and thus the condition of unable to distinguish multiple points does not occur. Therefore, the object positioning and post-processing may be performed using conventional methods for positioning a single object, e.g. calculating a gravity center of the object. When the number of maxima is larger than 1, the process enters the Step $S_{24}$.

Step $S_{24}$: In this step it is able to further confirm whether the calculated plurality of local maxima, e.g. $LM_1$ and $LM_2$ shown in FIG. 2, belong to different objects. In one embodiment, it is able to compare the object area $R_O$ with an area threshold. As the object area $R_O$ corresponding to multiple objects is relatively larger, it is able to identify a single object when the object area $R_O$ is smaller than the area threshold, and thus the object positioning and post-processing may be performed according to conventional methods for positioning a single object. In another embodiment, the processing unit 15 may calculate a distance between local maxima D between the local maximum $LM_1$ and the local maximum $LM_2$ (as shown in FIG. 2) and compare the distance between local maxima D with a distance threshold. As a reasonable relative distance will exist between multiple objects, it is able to identify a single object when the distance between local maxima D is smaller than the distance threshold (Step $S_{241}$), and thus the object positioning and post-processing may be performed according to conventional methods for positioning a single object.

Step $S_{25}$: When the object area $R_O$ is larger than or equal to the area threshold and/or the distance between local maxima D is larger than or equal to the distance threshold, the processing unit 15 identifies positions of the local maxima $LM_1$ and $LM_2$ as a plurality of contact positions such that the multipoint positioning is accomplished.

Figure 5:
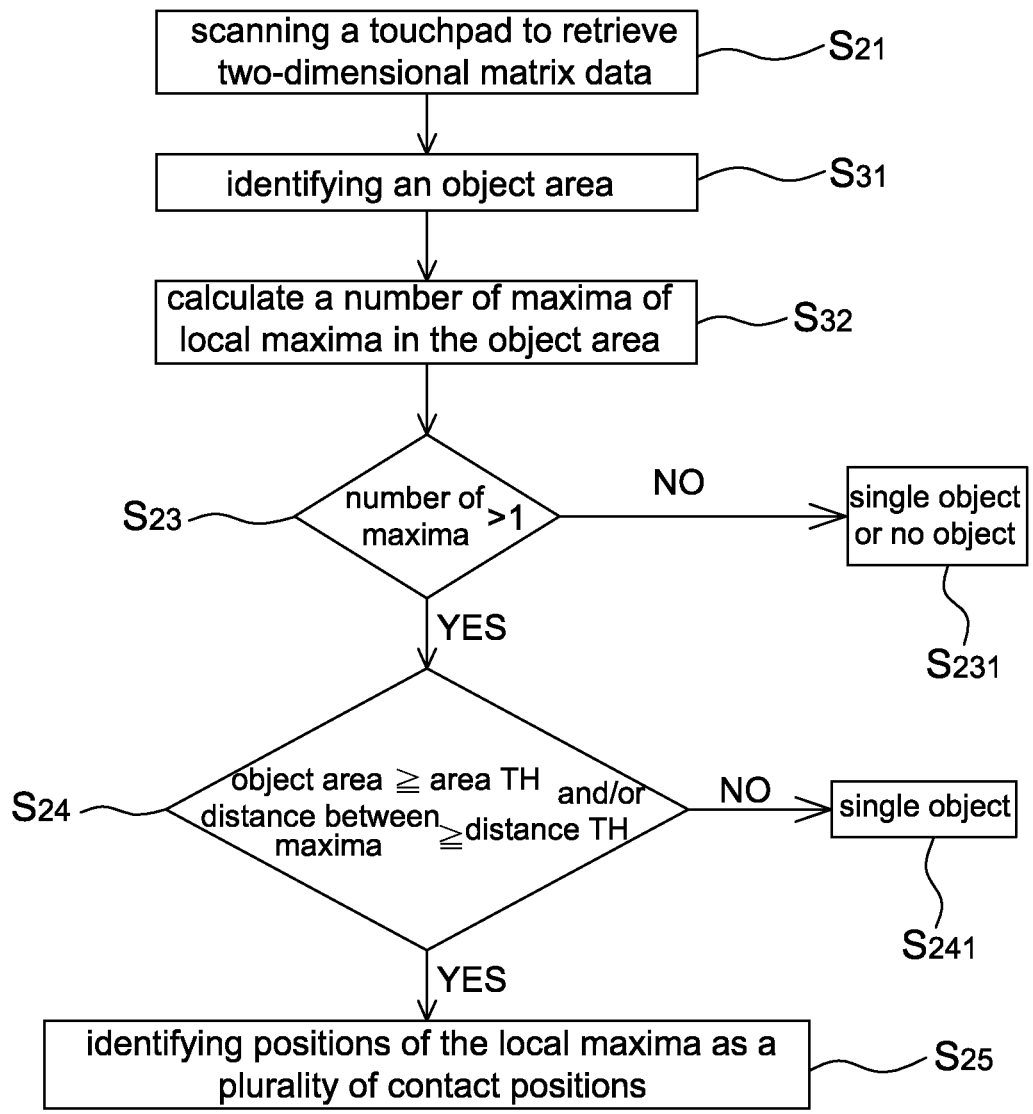
FIG. 5 shows a flow chart of the multipoint positioning method for a touchpad according to a second embodiment of the present disclosure.

Referring to FIG. 5, it shows a flow chart of the multipoint positioning method according to a second embodiment of the present disclosure, which includes the steps of: scanning a touchpad to retrieve two-dimensional matrix data (Step $S_{21}$); identifying an object area (Step $S_{31}$); calculating a number of maxima of local maxima in the object area (Step $S_{32}$); identifying whether the number of maxima is larger than 1 (Step $S_{23}$); if no, identifying a single object or no object (Step $S_{231}$), if yes, entering Step $S_{24}$; comparing the object area with an area threshold and/or comparing a distance between the local maxima with a distance threshold (Step $S_{24}$); when the object area is smaller than the area threshold and/or the distance between the local maxima is smaller than the distance threshold, identifying a single object (Step $S_{241}$); when the object area is larger than or equal to the area threshold and/or the distance between the local maxima is larger than or equal to the distance threshold, identifying positions of the local maxima as a plurality of contact positions (Step $S_{25}$). In this embodiment, the steps identical to those of the first embodiment are indicated by the same reference numbers. The difference between the second embodiment and the first embodiment is that, the processing unit 15 firstly identifies an object area $R_O$ (FIG. 2) at the same time or after receiving the two-dimensional matrix data $I_{11}$ and then calculates a number of maxima of local maxima only in the object area $R_O$ instead of calculating the number of maxima of local maxima in the whole two-dimensional matrix data $I_{11}$. The steps $S_{23}$-$S_{25}$ after the number of maxima of local maxima has been calculated (i.e. after the Step $S_{32}$) are identical to the first embodiment.

Referring to FIGS. 2 and 5, the input unit 121 and the read unit 122 sequentially scan the touchpad 11, and the two-dimensional matrix data $I_{11}$ is outputted through the detection unit 13 and the A/D converter 14 (Step $S_{21}$), and this step is identical to the first embodiment.

Step $S_{31}$: The processing unit 15 identifies a plurality of matrix cells 110 in the two-dimensional matrix data $I_{11}$ having a data value larger than a data threshold TH as an object area $R_O$ at the same time or after receiving the two-dimensional matrix data $I_{11}$. As mentioned above, corresponding to different embodiments of the touchpad 11, the two-dimensional matrix data $I_{11}$ may be intensity data or voltage variation data, and the data threshold TH may be an intensity threshold or a voltage variation threshold. As mentioned above, the processing unit 15 may also combine a plurality of related object sections at adjacent rows to a complete object area by means of image grouping technique.

Step $S_{32}$: Next, the processing unit 15 may calculate a number of maxima of local maxima in the object area $R_O$ according to the method of FIG. 4, e.g. the number of maxima is 2 in FIG. 2.

Next, the Steps $S_{23}$-$S_{25}$ are identical to the Steps $S_{23}$-$S_{25}$ of the first embodiment and thus details thereof are not described herein.

Figure 6A:
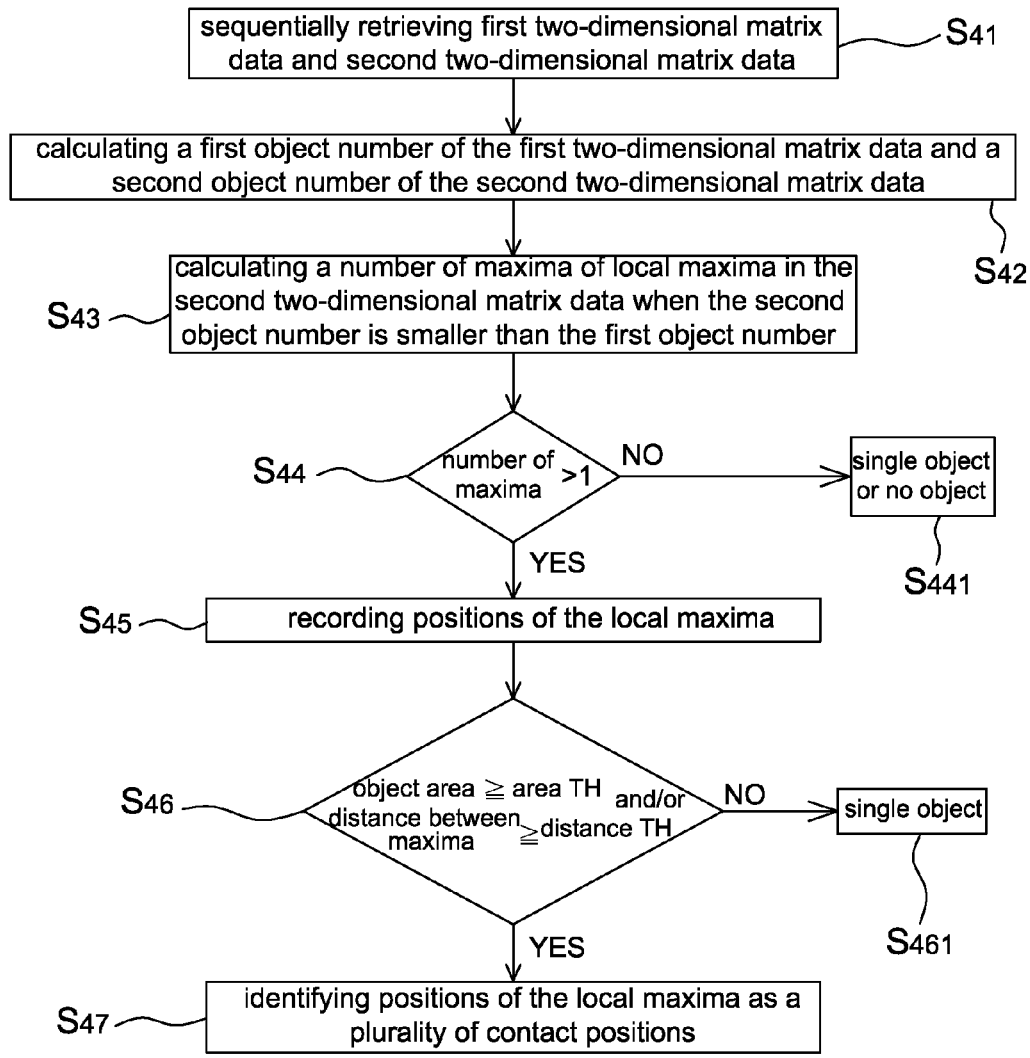
FIG. 6A shows a flow chart of the multipoint positioning method for a touchpad according to a third embodiment of the present disclosure.

Referring to FIG. 6A, it shows a flow chart of the multipoint positioning method according to a third embodiment of the present disclosure, which includes the steps of: sequentially retrieving first two-dimensional matrix data and second two-dimensional matrix data (Step $S_{41}$); calculating a first object number of the first two-dimensional matrix data and a second object number of the second two-dimensional matrix data (Step $S_{42}$); calculating a number of maxima of local maxima in the second two-dimensional matrix data when the second object number is smaller than the first object number (Step $S_{43}$); identifying whether the number of maxima is larger than 1 (Step $S_{44}$); if no, identifying a single object or no object (Step $S_{441}$), if yes, entering Step $S_{45}$; recording positions of the local maxima (Step $S_{45}$); comparing the object area with an area threshold and/or comparing a distance between the local maxima with a distance threshold (Step $S_{46}$); when the object area is smaller than the area threshold and/or the distance between the local maxima is smaller than the distance threshold, identifying a single object (Step $S_{461}$); when the object area is larger than or equal to the area threshold and/or the distance between the local maxima is larger than or equal to the distance threshold, identifying positions of the local maxima as a plurality of contact positions (Step $S_{47}$).

Figure 6B:
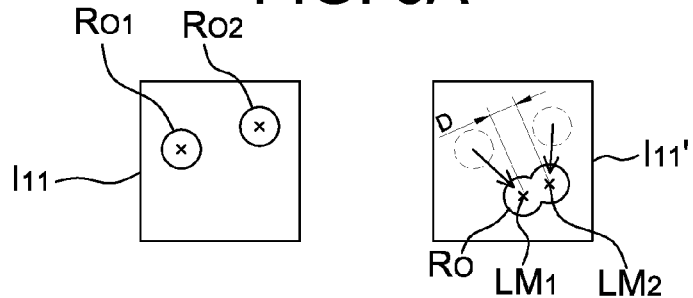
FIG. 6B shows a schematic diagram of successively retrieved two-dimensional data in the multipoint positioning method for a touchpad according to the third embodiment of the present disclosure.

Referring to FIGS. 2, 6A and 6B, details of the multipoint positioning method for a touchpad according to the third embodiment of the present disclosure are described hereinafter.

Step $S_{41}$: At first, the input unit 121 and the read unit 122 scan the touchpad 11 within two successive scanning periods so as to sequentially retrieve first two-dimensional matrix data $I_{11}$ and second two-dimensional matrix data $I_{11}'$ as shown in FIG. 6B; i.e. the first two-dimensional matrix data $I_{11}$ is a previously retrieved matrix data of the second two-dimensional matrix data $I_{11}'$.

Step $S_{42}$: Next, the processing unit 15 calculates a first object number in the first two-dimensional matrix data $I_{11}$ and a second object number in the second two-dimensional matrix data $I_{11}'$. For example, as shown in FIG. 6B the first two-dimensional matrix data $I_{11}$ includes two object areas $R_{O1}$ and $R_{O2}$ and thus the first object number is 2; the second two-dimensional matrix data $I_{11}'$ includes one object area $R_O$ and thus the second object number is 1, wherein the first object number is an area number in the first two-dimensional matrix data $I_{11}$ having data values larger than or equal to a data threshold TH; and the second object number is an area number in the second two-dimensional matrix data $I_{11}'$ having data values larger than or equal to the data threshold TH. In this embodiment, an object area is an area in the second two-dimensional matrix data $I_{11}'$ having data values larger than or equal to a data threshold, and the processing unit 15 may also combine a plurality of related object sections at adjacent rows to one complete object area by means of image grouping technique. As mentioned above, according to different embodiments of the touchpad 11, the first two-dimensional matrix data $I_{11}$ and the second two-dimensional matrix data $I_{11}'$ may be intensity data or voltage variation data; and the data threshold TH may be an intensity threshold or a voltage variation threshold. It should be mentioned that the first object number may be calculated during a scanning period associated with the first two-dimensional matrix data $I_{11}$ and stored in the memory unit 16 but not obtained during retrieving the second two-dimensional matrix data $I_{11}'$.

Step $S_{43}$: When the second object number is smaller than the first object number, it means that the coupling of the object data may exist. For example, two objects are separated in a previous two-dimensional data (as FIG. 6A) but the two objects are merged in a next two-dimensional data (as FIG. 6B). Accordingly, the processing unit 15 calculates a number of maxima of local maxima (e.g. $LM_1$ and $LM_2$ shown in FIG. 6B) in the second two-dimensional matrix data $I_{11}'$, e.g. equal to 2 herein. The method of identifying a local maximum is similar to FIG. 4 and its corresponding descriptions and thus details thereof are not described herein. When the second object number is equal to the first object number, the contact position may be determined according to conventional methods, e.g. calculating the gravity center of the object area to be served as the contact position of each object.

Step $S_{44}$: When the number of maxima in the second two-dimensional matrix data $I_{11}'$ is not larger than 1, it means that there is no object existing or only a single object exists (Step $S_{441}$), i.e. same as Step $S_{231}$. When the number of maxima in the second two-dimensional matrix data $I_{11}'$ is larger than 1, positions of the local maxima are recorded in the memory unit 16 (Step $S_{45}$).

Next, the Steps $S_{46}$-$S_{47}$ are similar to the Steps $S_{24}$-$S_{25}$ of the first embodiment but different in that the second two-dimensional matrix data $I_{11}'$ is the target to be processed in the third embodiment. That is, in this embodiment it is only to replace the two-dimensional data $I_{11}$ in the first embodiment by the second two-dimensional matrix data $I_{11}'$.

Referring to FIG. 6B, for example in the step $S_{46}$ the processing unit 15 calculates an object area $R_O$ in the second two-dimensional matrix data $I_{11}'$, identifies the positions of the local maxima as a plurality of contact positions when the object area $R_O$ is larger than or equal to an area threshold, and identifies a single object when the object area $R_O$ is smaller than the area threshold. The processing unit 15 may further calculate a distance between local maxima D according to the positions of the local maxima $LM_1$ and $LM_2$, identifies the positions of the local maxima as a plurality of contact positions when the distance between local maxima D is larger than or equal to a distance threshold, and identifies a single object when the distance between local maxima D is smaller than the distance threshold.

The difference between the third embodiment and the first embodiment is that in the third embodiment the processing unit 15 identifies whether the object number between two successive two-dimensional matrix data changes or not at first. When the object number decreases, it means that the detection data may be coupled to each other and then identifies positions of the local maxima in the second two-dimensional matrix data $I_{11}'$ as a plurality of contact positions, wherein the method of determining the plurality of contact positions according to the second two-dimensional matrix data $I_{11}'$ is similar to the first embodiment.

It should be mentioned that although two objects are used as an example to describe the present disclosure, the positioning method of every embodiment may be extended to the positioning of more than two objects, and the positioning method for more than two objects is similar to those shown in FIGS. 3, 5 and 6A.

Figure 7:
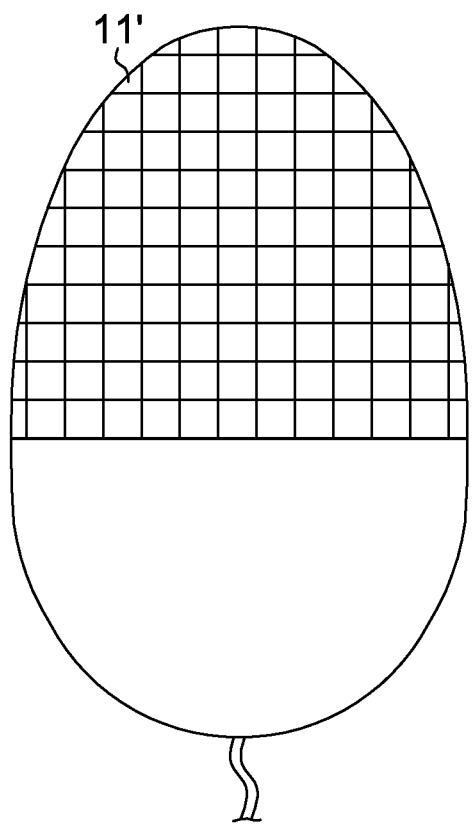
FIG. 7 shows an application of the touchpad according to the embodiment of the present disclosure.

In addition, the multipoint positioning method according to the embodiment of the present disclosure may also be applied to a touch mouse including a touchpad 11' as shown in FIG. 7, wherein the touchpad 11' may include a two-dimensional sensing matrix which is located at the top front surface of the touch mouse, but the touchpad 11' is not limited to be a half of the upper surface. Therefore, the two-dimensional matrix data mentioned in the above embodiments may be the two-dimensional data of a two-dimensional polygon or irregular shape. In other words, the two-dimensional data mentioned in the above embodiments may be arranged as any shape instead of a rectangle or a square, and the shape may be determined according to the touchpad being used.

As mentioned above, conventional multiple fingers contact sensing method has to separate finger areas according to the valley of one-dimensional information such that the identification procedure is more complicated and the separated finger areas may be asymmetric to each other. Therefore, the present disclosure further provides a multipoint positioning method for a touchpad (FIGS. 3, 5 and 6A) that may perform the multipoint positioning according to the local maxima in two-dimensional data without calculating the centroid of finger areas and may increase the positioning accuracy by referencing the object area and previous two-dimensional data.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A multipoint positioning method for a touchpad, comprising:
    scanning a touchpad to retrieve two-dimensional data;
    calculating an object area and a number of maxima of local maxima in the two-dimensional data;
    comparing the object area with an area threshold when the number of maxima is larger than 1; and
    identifying positions of the local maxima as a plurality of contact positions when the object area is larger than or equal to the area threshold.

2. The multipoint positioning method as claimed in claim 1, wherein the two-dimensional data is intensity data or voltage variation data.

3. The multipoint positioning method as claimed in claim 2, wherein the object area is an area in the two-dimensional data having the intensity data larger than or equal to an intensity threshold or having the voltage variation data larger than or equal to a voltage variation threshold.

4. The multipoint positioning method as claimed in claim 1, further comprising:
    identifying a single object when the object area is smaller than the area threshold.

5. The multipoint positioning method as claimed in claim 1, wherein when the number of maxima is larger than 1, further comprises:
    calculating a distance between the local maxima; and
    identifying the positions of the local maxima as a plurality of contact positions when the object area is larger than or equal to the area threshold and the distance between the local maxima is larger than or equal to a distance threshold.

6. The multipoint positioning method as claimed in claim 1, wherein the local maxima are matrix cells in the two-dimensional data having a data value larger than or equal to data values of 8 adjacent matrix cells thereof, 5 adjacent matrix cells thereof or 3 adjacent matrix cells thereof.

7. A multipoint positioning method for a touchpad, comprising:
    scanning a touchpad to retrieve two-dimensional data;
    identifying a plurality of matrix cells in the two-dimensional data having a data value larger than or equal to a data threshold as an object area;
    calculating a number of maxima of local maxima in the object area;
    comparing the object area with an area threshold when the number of maxima is larger than 1; and
    identifying positions of the local maxima as a plurality of contact positions when the object area is larger than or equal to the area threshold.

8. The multipoint positioning method as claimed in claim 7, wherein the two-dimensional data is intensity data or voltage variation data; and the data threshold is an intensity threshold or a voltage variation threshold.

9. The multipoint positioning method as claimed in claim 7, further comprising:
    identifying a single object when the object area is smaller than the area threshold.

10. The multipoint positioning method as claimed in claim 7, wherein when the number of maxima is larger than 1, further comprises:
    calculating a distance between the local maxima; and
    identifying the positions of the local maxima as a plurality of contact positions when the object area is larger than or equal to the area threshold and the distance between the local maxima is larger than or equal to a distance threshold.

11. The multipoint positioning method as claimed in claim 7, wherein the local maxima are matrix cells in the two-dimensional data having a data value larger than or equal to data values of 8 adjacent matrix cells thereof, 5 adjacent matrix cells thereof or 3 adjacent matrix cells thereof.

12. A multipoint positioning method for a touchpad, comprising:
    scanning a touchpad to sequentially retrieve first two-dimensional data and second two-dimensional data;
    calculating a first object number of the first two-dimensional data and a second object number of the second two-dimensional data;
    calculating a number of maxima of local maxima in the second two-dimensional data when the second object number is smaller than the first object number; and
    recording positions of the local maxima when the number of maxima is larger than 1.

13. The multipoint positioning method as claimed in claim 12, wherein when the number of maxima is larger than 1, further comprises:
    calculating an object area in the second two-dimensional data;
    identifying the positions of the local maxima as a plurality of contact positions when the object area is larger than or equal to an area threshold; and
    identifying a single object when the object area is smaller than the area threshold.

14. The multipoint positioning method as claimed in claim 13, wherein the object area is an area in the second two-dimensional data having data values larger than or equal to a data threshold.

15. The multipoint positioning method as claimed in claim 12, wherein the first object number is an area number in the first two-dimensional data having data values larger than or equal to a data threshold; and the second object number is an area number in the second two-dimensional data having data values larger than or equal to the data threshold.

16. The multipoint positioning method as claimed in claim 14, wherein the data threshold is an intensity threshold or a voltage variation threshold.

17. The multipoint positioning method as claimed in claim 12, wherein when the number of maxima is larger than 1, further comprises:
   calculating a distance between the local maxima;
   identifying the positions of the local maxima as a plurality of contact positions when the distance between the local maxima is larger than or equal to a distance threshold; and
   identifying a single object when the distance between the local maxima is smaller than the distance threshold.

18. The multipoint positioning method as claimed in claim 12, wherein the local maxima are matrix cells in the second two-dimensional data having a data value larger than or equal to data values of 8 adjacent matrix cells thereof, 5 adjacent matrix cells thereof or 3 adjacent matrix cells thereof.

19. The multipoint positioning method as claimed in claim 12, wherein the first two-dimensional data and the second two-dimensional data are intensity data or voltage variation data.

20. The multipoint positioning method as claimed in claim 12, wherein the first two-dimensional data is a previously retrieved matrix data of the second two-dimensional data.

\* \* \* \* \*